Feb. 3, 1970  E. HOLZ  3,493,023

CUTTING APPARATUS

Filed May 22, 1967

United States Patent Office 3,493,023
Patented Feb. 3, 1970

3,493,023
CUTTING APPARATUS
Ernst Holz, Hauptstrasse 76, Heidenheim-
Schnaitheim, Germany
Filed May 22, 1967, Ser. No. 641,438
Claims priority, application Germany, May 23, 1966,
H 59,479
Int. Cl. B26d 1/20, 1/48
U.S. Cl. 146—78                            7 Claims

ABSTRACT OF THE DISCLOSURE

A cutting apparatus comprising a first unit which defines a path for the advancement of partially comminuted material in a predetermined direction. The first unit has at least one surface which faces downstream of the path and extends in a plane normal to the predetermined direction. A second unit includes a cutting knife mounted downstream of this surface for movement across the path at a right angle to the predetermined direction, and this cutting knife has a cutting edge portion which engages the surface in sliding contact therewith.

CROSS-REFERENCE TO RELATED APPLICATION

Figure 1:
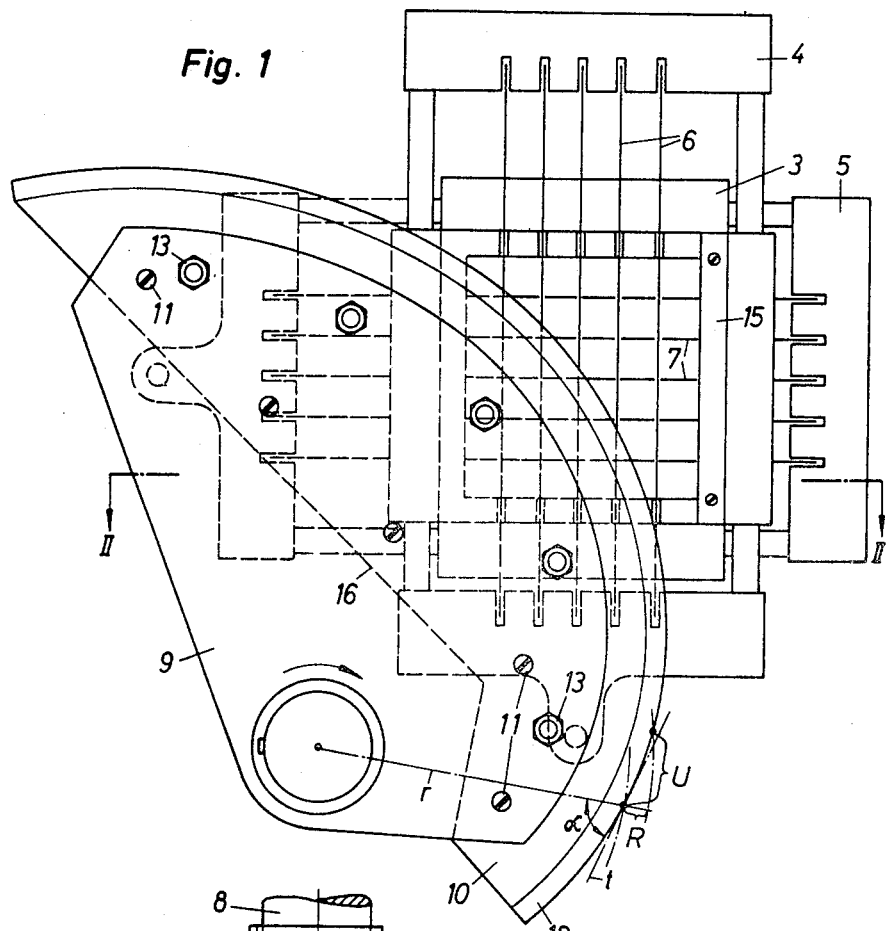

An apparatus which can utilize the invention hereindescribed is disclosed in my copending applications, Ser. No. 625,560 filed on Mar. 20, 1967 and entitled "Cutting Apparatus," and Ser. No. 638,191 filed on May 9, 1967, and entitled "Cutting Device."

BACKGROUND OF THE INVENTION

The present invention relates to cutting apparatus in general, and more specifically to a cutting device which is particularly suited for cutting bacon and other foodstuffs. Still more particularly, the present invention relates to cutting apparatus for dicing of various materials.

In the cutting, and particularly, the dicing or cubing of bacon, but also of other foodstuffs such as meats, it is known from my above-mentioned copending applications to utilize an apparatus including at least one first blade against which material to be cut is fed in a given direction of advancement, whereas at least one elongated second blade is arranged adjacent the first blade downstream thereof, an is inclined with reference to the first blade. Guide means is provided for guiding the material to be cut in a given direction and in a predetermined path against the cutting edges of the two blades and the material is thus cut by the blades, which are reciprocated transversely of the direction of advancement of the material to be cut and at right angles to one another, into strips. A further knife or blade is arranged downstream of these first two blades and cuts the partially comminuted material in the direction at right angles or normal to the advancement of such material. Thereby the strips of material are subdivided into cubes.

This apparatus is fully operative for cutting bacon and a variety of other materials, including various other foodstuffs. However, problems have been encountered where certain types of meat must be so cubed. Specifically, such problems exist where cheaper cuts of meat must be cubed which have a relatively large content of tendons and sinews. It is well known that these are encased in smooth sheaths which are rather slippery so that the final cutting knife, which is to cube the strips of meat, usually slides off such tendons, or vice versa, without severing the tendons. As a result, the strips of meat are only partially subdivided by the cutting knife and leave the cutting apparatus in form of rows of meat cubes which are held together by the non-severed tendons. This makes proper cooking and distribution of the meat impossible. Furthermore, it is frequently found that the tendons will become entangled in the cutter knife and force shut-down of the cutting apparatus until the cutter knife can be freed. It goes without saying that all of this is not tolerable and that the provision of an improved cutting apparatus not possessed of these disadvantages is highly desirable.

SUMMARY OF THE INVENTION

The present invention overcomes the disadvantages outlined above.

More specifically, the present invention provides a cutting apparatus which is capable of cleanly cubing or dicing even such foodstuffs, including and particularly meats, which contain tendons or sinews.

The apparatus in accordance with the present invention is rugged and highly reliable in operation, and can be operated by unskilled persons.

In accordance with my invention the novel cutting apparatus hereindisclosed comprises a first unit which defines a path for the advancement of partially comminuted material in a predetermined direction. This first unit has surface portions which face downstream of the path and in a plane normal to the predetermined direction of advancement of the material. A second unit is also provided and includes a cutting knife mounted downstream of these surface portions for movement across the path at a right angle to the predetermined direction. In accordance with one feature of my invention, this cutting knife has a cutting edge portion which engages the surface portions of the first unit in sliding contact therewith.

The apparatus in accordance with my invention obtains, as a result of the coaction between the aforementioned cutting edge portion and the surface portions engaged thereby, a shearing action which provides for clean severing of materials, such as meat, even if such meat contains a high proportion of sinews and tendons. It will be understood that the surface portions engaged by the cutting edge portion of the cutting knife act in effect as a counterknife in the same manner in which each blade of a scissors acts as a counterknife for the other blade of the same scissor. In fact, the apparatus according to the present invention not only provides for very clean and reliable severing of the material to be comminuted, but also represents a self-sharpening arrangement for the cutting knife as a result of the sliding engagement of the cutting edge portion thereof with the aforementioned surface portions of the first unit.

I mount the cutting knife for rotation about an axis which extends parallel to the direction of advancement of the material to be comminuted, so that the cutting knife rotates in a plane normal to this direction. In accordance with a further feature of my invention, whose efficacy has been confirmed by tests which I have conducted, the cuting edge portion is provided with a cutting edge which is arcuately curved with reference to the axis of rotation in such a manner that during rotation of the cutting knife this cutting edge is an effect "drawn" through the material to be comminuted. I achieve this by so arranging the arcuate curvature of this cutting edge that it defines a portion of a spiral, whereby an angle formed between a tangent to the cutting edge and a radius which intersects this tangent is smaller than 90 degrees, with the angle being located forwardly of the radius as seen in the direction of rotation of the cutting knife. My tests have shown that I can obtain optimal cutting efficiency if the arcuate curvature of the cutting edge is a portion of a logarithmic spiral having a pitch between the values ⅓ and ⅕, wherein this pitch represents the factor $m$ in the formula $r=ae^{m\alpha}$ for logarithmic spirals, and indicates the relationship of the radial proession to the orbital path of a point on the periphery the cutting edge.

It will be evident that the blade, and specifically the tting edge thereof, will be subject to wearing as a result prolonged use. Over a period of time this means some ss of material and results in a variation in the degree pressure with which the cutting edge engages the surce portions which act, in effect, as a counter-knife. To impensate for such variations, and to assure that optium cutting conditions are obtained at all times, it is lvantageous in accordance with the invention to prode an arrangement whereby the degree of pressure with hich the cutting edge is in engagement with the counterife surface portions, can be varied at the will of the erator. Such an arangement may, in accordance with e invention, be a simple deflecting arrangement for the ade, as will be described later, although it should be nderstood that other arrangements are entirely conceivle and could very well be substituted.

The novel features which are considered as characteristic for the invention are set forth in particular in the ppended claims. The invention itself, however, both as its construction and its method of operation, together ith additional objects and advantages thereof, will be est understood from the following description of specific mbodiments when read in connection with the accomanying drawing.

BRIEF DECRIPTION OF THE DRAWING

Figure 2:
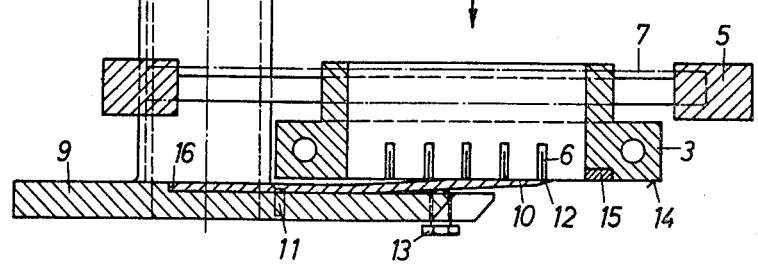

FIG. 1 is a somewhat schematic elevational view of an pparatus embodying my invention, as seen from the ront thereof oppositely the direction of advancement of aterial to be comminuted; and FIG. 2 is a section taken on the line II—II of FIG. 1.

DESCRIPTION OF THE PREFERRED EMBODIMENTS

Discussing now the drawing in detail, it will be seen hat there is provided a holder or frame 3 which defines n internal opening (not numbered) through which material to be comminuted can pass. In FIG. 2 this openng is most clearly illustrated and the direction of advancement of the material to be comminuted is indicated y the arrow M. The holder or frame 3 carries a first eciprocable support 4 and a second reciprocable support 5 which is movable at right angles to the direction of eciprocation of the support 4. The precise details show ow the supports 4 and 5 are carried by the frame 3, and ow they are reciprocated by a non-illustrated drive means, need not be shown or discussed herein, having been fully disclosed in my earlier mentioned copending applications. The support 4 carries one or, as illustrated, a plurality of cutting blades 6 whereas the support 5 carries a similar or different number of cutting blades 7 and it will be evident that, as material is advanced in the direction of the arrow M in FIG. 2, cross-wise reciprocation of the blades 6 and 7 in their respective supports 4 and 5 will result in cuting of such material into strips whose cross section in the illustrated embodiments will be square.

Immediately downstream of the blades 6 and 7 there is arranged a cutting knife comprising a holder 9 and a blade 10 whose combined configuration is evident from FIG. 1. The shaft 8 is driven in the direction of the arrow illustrated in FIG. 1 by a non-illustrated drive means, and no drive means is shown because many well-known drive means will readily suggest themselves to those skilled in the art. The holder 9 of the cutting knife is turnable with the shaft 8 and secured to the holder 9 is the actual cutting blade 10 which, preferably, is releasably secured to the holder 9, by a suitable means, such as the holding screws 11. Cutting blade 10 has a cutting edge portion 12 which, as is evident from FIG. 2, engages surface portions on the frame 3, on the cutter blades 6 and 7, or on both, which face in downstream direction, that is which face in the direction of the arrow M in FIG. 2. The engagement takes place under pressure so that the cutting edge portion 12 in effect "wipes" over the surface portions which it engages whereby material partially comminuted by the cutter blades 6 and 7 and passing beyond these into the range of the cutting edge portion 12 of blade 10 are in effect "sheared" in the manner in which material is cut by a scissors. In other words, the edge portions which are engaged by the cutting edge portion 12 of the blade 10 act in effect as counter-knives.

In accordance with the invention the degree of pressure with which the cutting edge portion 12 engages the counter-knife surface portions can be varied by providing a suitable means for this purpose. FIGS. 1 and 2 illustrate one such means in form of one or more screws which are threaded through openings in the holder 9 and whose leading ends bear upon the blade 10 and deflect the same to a greater or lesser degree towards and into engagement with its associate counter-knife surface portions, depending on the extent to which the screws 13 are threaded into and out of the openings in the holder 9. This permits the necessary adjustment to compensate for wear of the blade 10, particularly in the region of the cutting edge portion 12 thereof. To relieve the screws 11, which join the blade 10 to the holder 9, that surface of the holder 9 which the blade 10 overlies partially is provided with a recess corresponding in outline to that portion of the blade 10 which overlies the surface of the holder 9. This is most clearly evident from FIG. 2, and it will be seen that the recess is bounded by one or more inner shoulders 16 on which the blade 10 bears so that stresses originating during the cutting operation are transmitted to these shoulders which thus serve to relieve the stress on the screws 11.

In accordance with a further feature of the invention, I also provide in the illustrated embodiment, although not necessarily in all conceivable embodiments according to the invention, a separate strip-, bar- or blade-shaped counter-knife member 15 which is advantageously made from hardened material, such as would be utilized for the making of knife blades, and which is in the illustrated embodiment recessed in the surface 14 of the frame 3, so that it is flush with this surface which faces in downstream direction. Of course, the arrangement is such that the counter-knife member 15 will under all circumstances be in engagement with the cutting edge portion 12 of the blade 10 when the latter rotates about the axis or shaft 8. FIG. 1 illustrates that the member 15 can be releasably held in place by non-numbered screws or similar expedients.

In accordance with my tests, as discussed earlier herein, it is advantageous that a "drawing" effect be achieved during rotation of the blade 10 to thereby facilitate proper and clean cutting of the material to be comminuted.

Accordingly, the edge of the cutting edge portion 12 of the blade 10 is formed to follow partially the contours of a logarithmic spiral. I have found it particularly advantageous if the ratio of radial progression R to peripheral distance U be approximately 1:4, as illustrated in this embodiment, although this is only one of many possibilities. This value of 1:4 represents the cotangent of the angle which is located in forward direction as seen in direction of rotation of blade 10, between the radius $r$ and the tangent $t$ at the point of intersection thereof with the peripheral edge of the cutting edge portion 12. This angle is smaller than 90 degrees and, in the illustrated embodiment, is approximately 76 degrees. More generally speaking, I have found that I obtain very satisfactory operation if the value above-mentioned ranges between 1:3 and 1:5.

It will be understood that each of the elements described above, or two or more together, may also find a useful application in other types of arrangements differing from the types described above.

While the invention has been illustrated and described as embodied in a cutting apparatus, it is not intended to be limited to the details shown, since various modifications and structural changes may be made without departing in any way from the spirit of the present invention.

What is claimed as new and desired to be protected by Letters Patent is set forth in the appended claims:

1. A cutting apparatus, particularly for bacon and other foodstuffs, comprising, in combination, a first unit including frame means defining an opening for advancement of partially comminuted material in a predetermined path and direction, and having a first surface facing downstream of said path and in a plane normal to said predetermined direction, cutter means extending across said opening for partially comminuting such material and having at least one second surface facing downstream of said path and coplanar with said first surface, said surfaces comprising edge portions bounding said path so that material advancing in said predetermined direction moves past said edge portions in engagement therewith, and at least one counter-knife recessed in one of said surfaces coplanar therewith and constituting one of said edge portions; and a second unit including a cutting knife mounted downstream of said surfaces for movement across said path at a right angle to said predetermined direction, said cutting knife having a cutting edge portion engaging at least said one edge portion of at least said one surface in sliding contact therewith.

2. A cutting apparatus as defined in claim 1, wherein said cutter means is arranged for comminuting the material to be cut in planes parallel to said predetermined direction of advancement.

3. A cutting apparatus as defined in claim 1; and further comprising adjusting means operatively connected with said second unit and arranged for adjustably biasing said cutting edge portion toward said one surface.

4. A cutting apparatus as defined in claim 1, wherein said cutting knife comprises a support member rotatable about an axis extending parallel to said predetermined direction, and a blade member releasably connected to said support member and provided with said cutting edge portion.

5. A cutting apparatus as defined in claim 4, wherein said cutting knife is mounted for rotation about said axis in a given direction, said blade member having a rear portion spaced from said cutting edge portion and bounded by an edge face, said support member having a face facing upstream of said path and being provided with a depression extending inwardly from an edge of said face and corresponding to the outline of said rear portion, said depression being at least partially bounded by an abutment shoulder facing said given direction and said rear portion being received in said depression with said edge face abutting said abutment shoulder oppositely said given direction and in stress-transmitting relationship therewith.

6. A cutting apparatus as defined in claim 1, wherein said counter-knife is removably recessed in said one surface and is constituted from hardened material.

7. A cutting apparatus, particularly for bacon and other foodstuffs, comprising in combination, a first unit including frame means defining an opening for advancement of partially comminuted material in a predetermined path and direction, and having a first surface facing downstream of said path and in a plane normal to said predetermined direction, and movable cutter means extending across said opening for partially comminuting such material and having at least one second surface facing downstream of said path and coplanar with said first surface, said surfaces comprising edge portions bounding said path so that material advancing in said path moves past said edge portions in engagement therewith; and a second unit including a cutting knife mounted downstream of said surfaces for rotation across said path at a right angle to and about an axis extending in said predetermined direction, said cutting knife having a cutting edge portion engaging at least one of said edge portions of at least one of said surfaces in sliding contact therewith and comprising an edge which is arcuately curved in a plane normal to said axis in form of a logarithmic spiral having a pitch between ⅓ and ⅕ so as to define between a tangent to said edge and a radius intersecting said tangent an angle of less than 90 degrees and located forwardly of the radius as seen in the direction of rotation of said cutting knife.

References Cited
UNITED STATES PATENTS

| | | | |
|---|---|---|---|
| 331,862 | 12/1885 | Bowman | 146—78 |
| 682,722 | 9/1901 | Lindenberg et al. | 146—78 |
| 1,430,049 | 9/1922 | Applegate | 146—78 |
| 2,076,749 | 4/1937 | Spires et al. | 146—78 |
| 2,611,408 | 9/1952 | Farmer | 146—124 |
| 3,109,471 | 11/1963 | Highley | 146—182 |

JAMES M. MEISTER, Primary Examiner

U.S. Cl. X.R.

146—101